United States Patent
Birkbeck et al.

(10) Patent No.: US 8,860,715 B2
(45) Date of Patent: Oct. 14, 2014

(54) METHOD AND SYSTEM FOR EVALUATION USING PROBABILISTIC BOOSTING TREES

(75) Inventors: Neil Birkbeck, Plainsboro, NJ (US); Michal Sofka, Franklin Park, NJ (US); Shaohua Kevin Zhou, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 290 days.

(21) Appl. No.: 13/228,505

(22) Filed: Sep. 9, 2011

(65) Prior Publication Data

US 2012/0069003 A1 Mar. 22, 2012

Related U.S. Application Data

(60) Provisional application No. 61/385,240, filed on Sep. 22, 2010, provisional application No. 61/424,715, filed on Dec. 20, 2010.

(51) Int. Cl.
*G06K 1/00* (2006.01)
*G06K 9/62* (2006.01)
*G06K 9/00* (2006.01)
*G06K 9/46* (2006.01)

(52) U.S. Cl.
CPC ............ *G06K 9/6256* (2013.01); *G06K 9/6282* (2013.01); *G06K 9/00986* (2013.01); *G06K 9/4614* (2013.01)
USPC .......................................... 345/419; 382/160

(58) Field of Classification Search
USPC .......................................... 345/419; 382/160
See application file for complete search history.

(56) References Cited

U.S. PATENT DOCUMENTS

| | | | |
|---|---|---|---|
| 7,702,596 B2 | 4/2010 | Tu et al. | |
| 7,754,096 B2 | 7/2010 | Creazzo et al. | |
| 7,995,820 B2 | 8/2011 | de Barros Carneiro et al. | |
| 2002/0002665 A1* | 1/2002 | Vlot et al. ..................... | 712/202 |
| 2003/0181809 A1 | 9/2003 | Hall et al. | |
| 2006/0094044 A1 | 5/2006 | Chakraborty et al. | |
| 2008/0071711 A1 | 3/2008 | Zhang et al. | |
| 2008/0240532 A1 | 10/2008 | Carneiro et al. | |
| 2009/0074280 A1 | 3/2009 | Lu et al. | |
| 2010/0149193 A1* | 6/2010 | Yu ................................. | 345/505 |
| 2010/0240996 A1 | 9/2010 | Ionasec et al. | |
| 2011/0021915 A1 | 1/2011 | Feng et al. | |

OTHER PUBLICATIONS

Tu, "Probabilistic Boosting-Tree: Learning Discriminative Models for Classification, Recognition, and Clustering" In Proc. IC CV, vol. 2, pp. 1589-1596, 2005.*
Zhuowen Tu; "Probabilistic Boosting-Tree: Learning Discriminative Models for Classification, Recognition, and Clustering"; Computer Vision, 2005. ICCV 2005. Tenth IEEE International Conference on Publication Date: Oct. 17-21, 2005; pp. 1589-1596; vol. 2; ISBN: 978-0-7695-2334-7; XP010857003;; 2005; Oct. 17, 2005.

(Continued)

*Primary Examiner* — David Zarka
*Assistant Examiner* — Sohum Kaji

(57) ABSTRACT

A method and system for evaluating probabilistic boosting trees is disclosed. In an embodiment, input data is received at a graphics processing unit. A weighted empirical distribution associated with each node of the probabilistic boosting tree is determined using a stack implementation. The weighted empirical distribution associated with each node is added to a total posterior distribution value.

27 Claims, 17 Drawing Sheets

(56) References Cited

OTHER PUBLICATIONS

Toby Sharp Ed et al; "Implementing Decision Trees and Forests on a GPU"; Computer Vision, 10th European Conference on Computer Vision, ECCV, Oct. 12-18, 2008, Marseille, FR; Springer-Verlag, Berlin; pp. 595-608; ISBN: 978-3-540-88692-1;XP019109348,; 2008; DE; Oct. 12, 2008.

Coates A et el; "Scalable learning for object detection with GPU hardware"; Intelligent Robots and Systems, IROS 2009, IEEE/RSJ International Conference on IEEE, Piscataway, NJ; pp. 4287-4293; ISBN: 978-1-4244-3803-7; XP031580445; 2009; US; Oct. 10, 2009.

Sharma B et al; "Towards a robust, real-time face processing system using CUDA-enabled GPUs"; High Performance Computing (HIPC), 2009 International Conference on, IEEE, Piscataway NJ; pp. 368-377; ISBN: 978-1-4244-4922-4; XP031649496;; 2009; US; Dec. 16, 2009.

Peng Wang et al; "Robust guidewire tracking in fluoroscopy"; Computer Vision and Pattern Recognition, CVPR 2009, IEEE Conference on Piscataway NJ; pp. 691-698; ISBN: 978-1-4244-3992-8; XP031607219; 2009; US; Jun. 20, 2009.

European Search Report dated Jun. 6, 2013.

* cited by examiner

Algorithm 1: PbtPosterior
 Data: $N$ node of the tree
 Data: $L=left(N)$, $R=right(N)$
 Result: $p_N(+1|x)$ the posterior probability for tree ← 206
      rooted at $N$
 if $Leaf(N)$ then return $q_N(+1)$;
 $p = \hat{q}_N(+1|x)$; ← 202 if $p > (1-e_1)$ then return PbtPosterior($R$);
 else if $p < e_1$ then return PbtPosterior($L$);
 else if $p > 0.5 + e_2$ then
  $\quad$ return $(1-p)q_L(+1) + p$PbtPosterior($R$)
 else if $p < 0.5 - e_2$ then
  $\quad$ return $(1-p)$PbtPosterior($L$)$+p\ q_R(+1)$
 else
  $\quad$ return $(1-p)$PbtPosterior($L$)$+p$ PbtPosterior($R$)

```
Algorithm 2: PbtPosteriorStackBased
─────────────────────────────────────────────
Data: N node of the tree
Result: p(+1|X) the posterior of the tree  ← 310
S = {<root,1.0>};
total ← 0
while || S || ≠ 0 do  ← 306
    <N,w> = pop(S);  ← 308
    if isLeaf(N) then
      │ total ← total + w * q_N(+1);  ← 302
      └ continue;
    p ← q̂_N(+1,χ);
    if p > (1-e_1) then
      └ S.push(<right(N),w>)
    else if p < e_1 then
      └ S.push (<left(N),w>)
    else if p > 0.5 + e_2 then
      │ L = left(N);
      │ total = total + w *(1-p) q_L(+1);
      └ S.push(<right(N),w * p>);
    else if p < 0.5-e_2 then
      │ R=left(N);
      │ total=total + w * p *q_R(+1);
      └ s.push(<left(N),w *(1-p)>)
    else
      │ // Descend down both nodes ;
      │ S.push(<right(N), w * p>);
      └ S.push(<left(N), w *(1-p)>)
                                                  ← 312
return total;
─────────────────────────────────────────────
```

FIG. 3

```
template<float feature_func(float3& pixel,
                            float nx,
                            float ny)>
__device__ float
pbt_evaluate_tree(const float3& pixel) {
  float4 stack [kMaxQueueSize];
  int         numInStack = 1;

// Insert root (@ 0,0) with weight 1.
  ....
  while(numInStack>0)  {
    __numInQueue;
    float4 node = stack[numInQueue];
    float prob =
      pbt_eval_classifier
        <feature_func>(pixel, node.x, node.y);
    if (prob > 1.0 - el)
    ...
  }
}
```

FIG. 6

```
float4 numCubes = tex2D(texPBT,x,y);
for (int i=0; i<numCubes.x; i++) {
    float4 cubemin = tex2D(PBT,x,y+2*i+1);
    float4 cubemax = tex2D(PBT,x,y+2*i+2);
    val += cubemin.w *
                haar_eval_cube(cubmin+pos,
                               cubemax+pos);
}
return val;
```

FIG. 9

$$I, \sqrt{I}, I^{0.333}, I^2, I^3, \max(0.0001, \log(I)), I_x, I_y, I_z$$

$$f = \langle |\nabla I|, \mathbf{d}\rangle, |f|, \sqrt{|f|}, f^2, |f|^3, \log(\max(10^{-3}, |f|))$$

$$\theta = \cos^{-1}((\frac{\nabla I}{|\nabla I|}, \mathbf{d})), \theta^2, \theta^3, \log(\max(10^{-3}, \theta))$$

$$\frac{|\nabla I|^2}{\sqrt{|\nabla I|^2 - f^2}}$$

FIG. 10

METHOD AND SYSTEM FOR EVALUATION USING PROBABILISTIC BOOSTING TREES

This application claims the benefit of U.S. Provisional Application No. 61/385,240, filed Sep. 22, 2010, and U.S. Provisional Application No. 61/424,715, filed Dec. 20, 2010, the disclosures of which are herein incorporated by reference.

BACKGROUND OF THE INVENTION

The present invention relates to evaluation of data using probabilistic boosting trees.

Discriminative classifiers are often a bottleneck in 3D pose detection routines. Tree-based classifiers, such as Probabilistic Boosting Trees (PBT) and Random Forests, are discriminative models used for vision-based classification and object detection. The classifier is typically evaluated at every pixel in an image, which can be inefficient. The PBT is a general type of decision tree that uses strong classifiers to make fuzzy decisions at internal nodes. Generally, using PBT requires multiple recursive calls, which slows down object detection.

Efficiency can be improved using hierarchical methods or cascades, but 3D medical applications and real-time applications require further efficiency improvements.

BRIEF SUMMARY OF THE INVENTION

The present invention provides a method and system for evaluation of probabilistic boosting trees. In an embodiment, input data is received at a graphics processing unit. A weighted empirical distribution associated with each node of the probabilistic boosting tree is determined using a stack implementation. The weighted empirical distribution associated with each node is added to a total posterior distribution value.

In an embodiment, posterior distribution of a probabilistic boosting tree is determined by determining a weighted empirical distribution associated with each node of the probabilistic tree using a stack implementation, and adding the weighted empirical distribution associated with each node to a total posterior distribution value. A root node of the probabilistic boosting tree is pushed onto a stack and then is determined whether to descend thru a node in a left sub-tree or a node in a right sub-tree.

In an embodiment, a discriminative classifier of the root node is determined. Based on the discriminative classifier satisfying certain conditions, a left node, a right node, or both the left node and the right node of the root node are descended. Descending a node comprises determining a discriminative classifier of that node. If the discriminative classifier is a leaf node, the weighted empirical distribution of the node is added to the total posterior value. Otherwise, the node is pushed onto a stack and the left node, right node, or both the left and the right node of the node are descended.

In an embodiment, the probabilistic tree is evaluated using a parallel computing architecture. The parallel computing architecture may be Compute Unified Device Architecture (CUDA). The stack may be associated with one of a plurality of threads running in parallel.

In an embodiment, a method and system for evaluating a forest of probabilistic boosting trees is disclosed. Input data is received at a graphics processing unit. The plurality of probabilistic boosting trees is evaluated using a stack implementation. A combined posterior distribution based on a posterior distribution of each of the plurality of probabilistic boosting trees is generated.

These and other advantages of the invention will be apparent to those of ordinary skill in the art by reference to the following detailed description and the accompanying drawings.

BRIEF DESCRIPTION OF THE DRAWINGS

FIG. 2 shows pseudocode for determining the posterior value of a node of a PBT using recursion;

FIG. 3 shows pseudocode for determining the posterior value of a node of a PBT using a stack implementation according to an embodiment of the present invention;

FIG. 6 illustrates an exemplary Compute Unified Data Architecture (CUDA) stack-based implementation of evaluating a PBT, in accordance with an embodiment of the present invention;

FIG. 9 shows an exemplary CUDA algorithm for implementing feature computation, in accordance with an embodiment of the present invention;

FIG. 10 shows a table of specific steerable features used, in accordance with an embodiment of the present invention;

DETAILED DESCRIPTION

The present invention is directed to a method and system for evaluation of probabilistic boosting trees. Embodiments of the present invention are described herein to give a visual understanding of the method for evaluation of probabilistic boosting trees. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
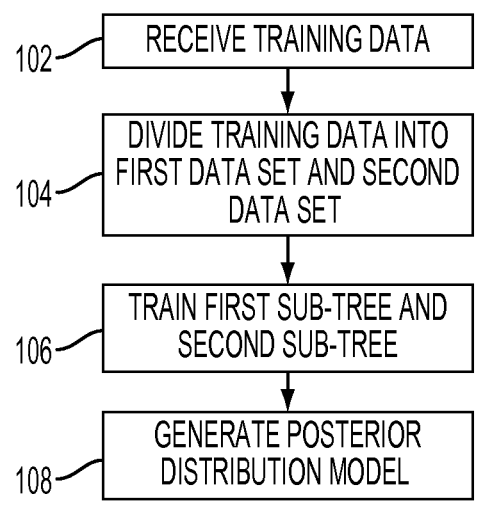
FIG. 1 illustrates a method for training a probabilistic boosting tree (PBT), in accordance with an embodiment of the present invention.

FIG. 1 illustrates a method for training a probabilistic boosting tree (PBT), according to an embodiment of the present invention. FIG. 1 more specifically describes accelerated training of a probabilistic boosting tree using a graphics processing unit (GPU).

At step 102, training data is received. The training data may be annotated training data including images having annotations representing locations of landmarks of objects in the image. The training data may consist of images having annotations representing locations of landmarks of objects in the image. Training data can be medical image data such as computerized tomography (CT), magnetic resonance imaging (MRI), X-ray, or Ultrasound image data.

A PBT models the posterior distribution of a data set. In training a PBT, the aim is to enable the use of the PBT as a discriminative model for classification and detection of an object in image data. A PBT is a binary decision tree with a fuzzy decision taken at each internal node of the tree depending on the output of the node's strong classifiers. The posterior value of any given individual node is determined by combining the posterior values of its child nodes using a weighted distribution. Weights used in the determination are determined by evaluating a node's strong (learned) classifier, $\hat{q}_N(y|x)$.

Each node N contains a strong classifier, $\hat{q}(y|x)$, and the empirical distribution of its leaf nodes $q_N(y)$, where $y \in \{-1, +1\}$, and x is an input point. The strong classifier can be any classifier that uses a problem specific feature. For example, an AdaBoost classifier can be used, which combines several binary weak classifiers to produce a strong estimate.

At step 104, the training data is divided into a first data set and a second data set by a classifier. The classifier that divides the training data is a strong (learned) classifier associated with the top parent node of the PBT.

At step 106, a first sub-tree and a second sub-tree are trained. The first data set is used to train a first sub-tree of the parent node and the second data set is used to train a second sub-tree of the parent node. A classifier at each node of the PBT is trained using a feature matrix.

During training of a PBT, the PBT is constructed using a set of positive and negative examples, which may originate from different 3D images. Each node of the PBT includes a strong classifier, such as the AdaBoost classifier, which may be trained for that particular node. A feature matrix is computed (e.g., every possible feature is evaluated for every input sample), and then each of the weak classifiers that constitute the strong classifier is trained using the feature matrix.

Using the feature matrix, the weak classifiers of the strong classifier may be trained sequentially by choosing each weak classifier using a greedy algorithm by considering how well each feature acts as a classifier. The algorithm for choosing the weak classifier during training includes three passes. First, feature bounds must be computed. Afterwards, a feature value is mapped to each sample within a histogram bin. Then, the histogram bins are incremented. Each sample may then be sampled with the trained classifier to compute an error. All of the aforementioned steps may be performed on a GPU. The operations for a classifier are independent, so each weak classifier can be trained by a different thread. The feature matrix column indexes the feature type, while the row indexes the sample. Each thread processes a single column.

The feature matrix is stored as a single component floating-point texture. The input is then split up into several textures of a maximum width and processed in chunks. Through CUDA texture limits, the restriction is a maximum width of 32768/sizeof(float)=8192. The feature data stays on the GPU for each of the weak training classifier passes. For each pass, the weights of the samples are updated.

Returning to FIG. 1, at step 108, a trained posterior distribution model of the PBT is generated based on the feature matrices of each node. The posterior distribution model represents a set of classifications that may be used for object classification and object detection. The set of classifications from the posterior distribution model of the PBT may be used thereafter by a detector to perform detection on image data. For example, the trained tree can be used to estimate the posterior probability of unseen data using a stack implementation on a GPU, as discussed in further detail in the following paragraphs.

The data parallel nature of evaluation using the PBT means that it is advantageous to utilize the computation power of a GPU instead of a central processing unit (CPU). Thus, in order to implement evaluation of a PBT on a GPU, multiple recursive calls, which are used in a traditional evaluation of a PBT may be replaced using a stack-based implementation. Cached texture memory is used to represent features and tree data structures. Since GPUs do not support recursive calls, the stack-based implementation is necessary to remove recursion.

For comparison, FIG. 2 shows pseudocode for determining the posterior value of a node of a PBT using recursion. FIG. 3 shows pseudocode for determining the posterior value of a node of a PBT using a stack implementation according to an embodiment of the present invention.

The posterior probability of a node, is recursively computed as a weighted combination of the posterior probabilities of the child nodes, referenced by reference numeral 204. The weight factor of this combination is determined by evaluating the node's strong classifier, referenced by reference numeral 202. The recursion terminates at leaf nodes of the tree (i.e., nodes with no child nodes), which simply return their empirical distribution $q_N$ (+1). The final result, or posterior distribution for each node is a sum of weighted empirical distributions of the child nodes, represented by a result referenced by reference numeral 206. The total weight given to any node's empirical distribution is the product of the weights associated with the path from the root to the node.

The algorithm for using a stack implementation is shown in FIG. 3. As illustrated in FIG. 3, a stack holds a list of to-be traversed nodes and their respective weights. When a leaf node is visited, the empirical distribution of that leaf node with its weight is added to a total empirical distribution of the root node, represented by reference numeral 302.

The root node and corresponding weight is first pushed into a stack. Each node in the stack is then processed sequentially, represented by reference numeral 306. If the node is a leaf node, the empirical distribution of the node is weighted by the corresponding weight and accumulated into the total posterior of the tree, represented by reference numeral 302. If a particular node has child nodes, then either the left or right child nodes are placed into the stack with weights that are the product of the parent node's weight and a factor dependent on the value of the parent node's strong classifier, represented by reference numeral 312. The empirical distribution of child nodes that are not pushed on the stack is weighted and accumulated to the total posterior distribution of the tree. The weight is proportional to the weight of the parent node and the value of the strong classifier evaluated at the parent. The sum of all of these products represents the total posterior distribution model for the PBT, represented by reference numeral 310.

Figure 4:
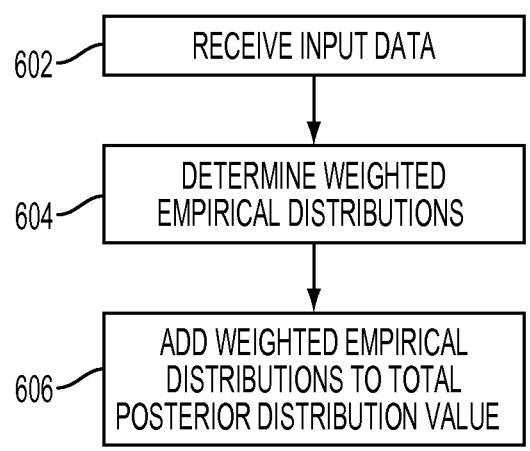
FIG. 4 illustrates a method for determining the posterior distribution of a node of a probabilistic boosting tree, in accordance with an embodiment of the present invention.

FIG. 4 illustrates a method for determining the posterior distribution of a node of a probabilistic boosting tree using a GPU, in accordance with an embodiment of the present invention.

At step 402, input data is received at a GPU. Input data may be a 2D image or a 3D volume received from an image acquisition device. The 3D volume can be a C-arm CT volume, computed tomography (CT) volume, magnetic resonance imaging (MRI) volume, etc. The 3D volume can be received from an image acquisition device, such as a C-arm image acquisition system, or can be a previously stored volume loaded from memory or storage of a computer system, or some other computer readable medium.

At step 404, a weighted empirical distribution associated with each node of the probabilistic boosting tree is determined using a stack implementation. The posterior probability $\tilde{p}(y|x)$ is determined using the principles described above with a stack implementation. Specifically, a root node of the probabilistic boosting tree is first pushed onto a stack. Then a determination is made whether to descend down the PBT thru a node in a left sub-tree or thru a node in a right sub-tree.

In determining whether to descend down a node, a discriminative classifier of the root node is first determined. If the discriminative classifier of the root node satisfies a first condition signifying that a left node must be descended, then the method proceeds to descend down a left node in the left sub-tree. If the discriminative classifier of the root node satisfies a second condition signifying that a right node must be descended, then the method proceeds to descend down a right node in the left sub-tree. If the discriminative classifier of the root node satisfies a third condition, then the method descends down both the aforementioned left node and the aforementioned right node.

After descending into a node, the discriminative classifier of that node is determined. If the node is determined to be a leaf node, then the weighted empirical distribution of that node is added to a total posterior distribution value. If the node satisfies the first condition, then the node will be pushed onto the stack, and the left child node of the node will be descended. If the node satisfies the second condition, then the node will be pushed onto the stack, and the right child node of the node will be descended. If the node satisfies the third condition, then the node is pushed onto the stack, and both the left and right child nodes are descended.

At step 406, the weighted empirical distribution of each node of the probabilistic boosting tree is added to the total posterior distribution value. The total posterior distribution represents a posterior distribution model that can be used in the detection of objects or landmarks in 2D images or 3D volumes.

In an advantageous embodiment, the above described method for evaluating a PBT can be implemented using a Compute Unified Device Architecture (CUDA) programming model. In the CUDA programming model, a parallel problem is decomposed into a grid of treaded blocks, with each block containing many threads. Blocks are assigned to the GPU's streaming multi-processors, which breaks down the block and schedules it in groups of 32 threads. In detection or classification, the grid of thread blocks will overly the input space (e.g., all pixels in the volume), and each thread will evaluate the classifier for a different pixel in the volume or a different orientation/scale hypothesis.

The programming model exposes the memory architecture, which includes a 16 kb low-latency shared memory (accessible from threads within the same block), high-latency local memory (per-thread), global memories (accessible by all threads), and cached global accesses through texture memory. Designing the algorithm to use these memory types appropriately is key to efficiency.

On a GPU implementation of evaluating a probabilistic boosting tree, several threads will descend the tree in parallel. Thus, neighboring threads may access the tree data structure in different regions, so placing the tree structure in global memory may cause slow uncoalesced memory access. However, since the tree data structure is too large to fit entirely in a 16 kb shared memory, the tree data structure may be packed into a texture image. Instead of node pointers, 2D location indices that reference the node's 2D region are placed inside the texture image.

Figure 5:
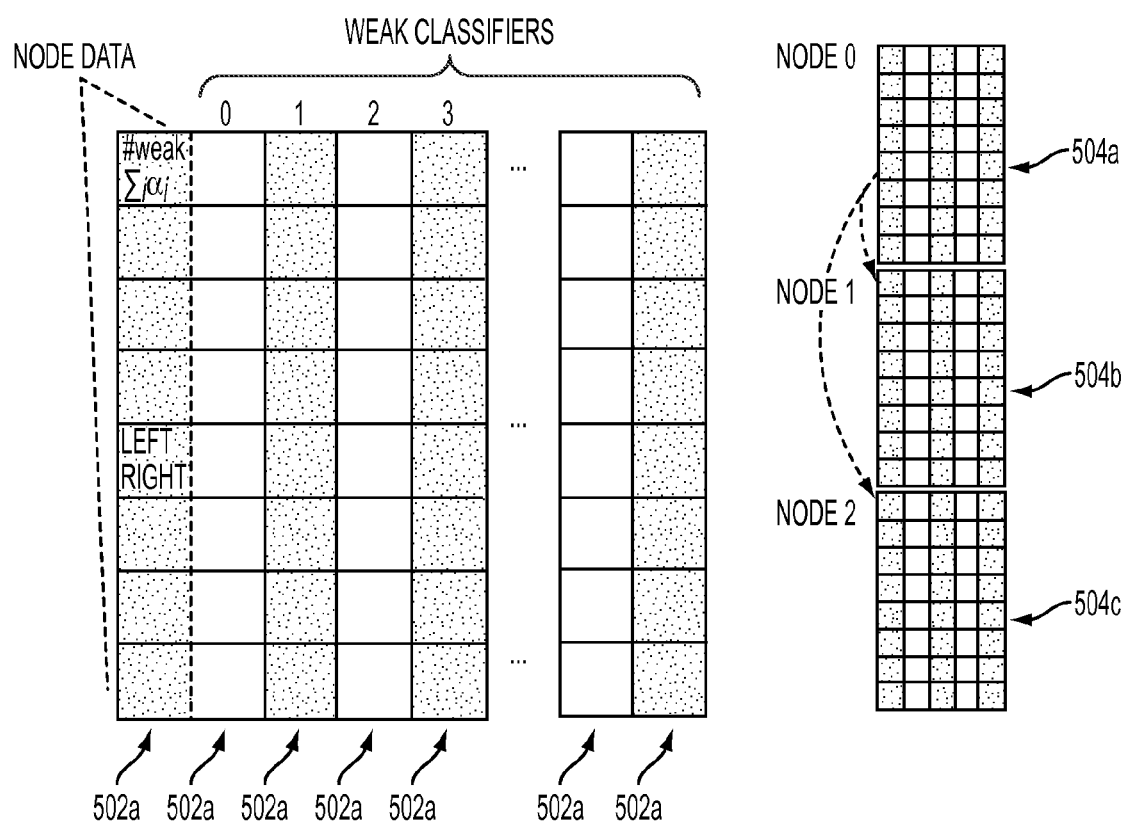
FIG. 5 illustrates an exemplary PBT data structure that is arranged into a texture image.

For example, the node data may contain AdaBoost classifiers, which include several weak classifiers. Each node contains either a simple threshold classifier or a histogram classifier whose decision is made on the basis of a single feature. Thus, the PBT node data that is placed inside the texture image must store the sum of alpha (or weighting) values, the number of weak classifiers, and the data for each of the classifiers. The weak classifiers are stored in adjacent columns of the texture image, and each column containing an associated weight $\alpha_i$. FIG. 5 illustrates an exemplary PBT data structure that is packed into a texture image. All weak classifiers are arranged along the columns 502a-502g, and each PBT node stores 2D texture coordinate indices to their child nodes, represented by 504a for node 0, 504b for node 1, and 504c for node 3.

FIG. 6 illustrates an exemplary CUDA stack-based implementation of evaluating a PBT using the algorithm shown in FIG. 3.

In order to introduce new feature types into a PBT evaluation, the CUDA PBT evaluation function shown in FIG. 6 is represented by feature_func, which allows new feature types to be added. Both 3D sample box information and 2D texture location of the feature data are passed to this feature evaluation function.

Marginal space learning (MSL) is an efficient method used to perform object localization. In MSL, a large 9-dimensional search space for a similarity transformation is decomposed into a series of smaller search spaces from translation to full similarity. During detection, a discriminative classifier is evaluated on pixels in the volume to determine a small set (e.g., 100-1000) of candidate positions. Orientation is detected by evaluation each of these candidate boxes with a series of hypothesis orientations and similarly for scale. The final list of candidates are aggregated to obtain a single pose estimate.

A Hierarchical Detection Network (HDN) to extend MSL to multiple structure detection may be used. The HDN decomposes a joint multi-object detection problem into sequential detections with spatial priors used for object prediction. The hierarchical detection of multiple structures is broken down into a network of nodes for detection position, orientation, and scale, for each structure. Spatial dependencies are also represented as arcs in this detection network.

Although MSL is an efficient framework for detection, the main computational burden comes from evaluating a discriminative classifier in each phase of the detection. In position detection, the classifier is either evaluated by looping over the 3D locations in the image (if the node has no ancestor) or by looping over a set of candidate locations provided by a preceding node. For orientation and scale detection, the classifier is evaluated over each of the input candidate locations using each of the possible orientation (or scale) hypothesis. The same classifier is evaluated on different data, which makes it an ideal detection algorithm for the data parallel power of a GPU. GPU accelerated implementations are possible, using a PBT as the classifier for MSL.

During detection, a PBT tree is evaluated with the context surrounding a specific location (and pose). Features may be computed on the fly from an input image. In MSL, position detection utilizes Haar features, and the subsequent orientation and scale detection utilize efficient steerable features that sample the image intensity and gradient in a volume using the candidate pose of the box.

Figure 7:
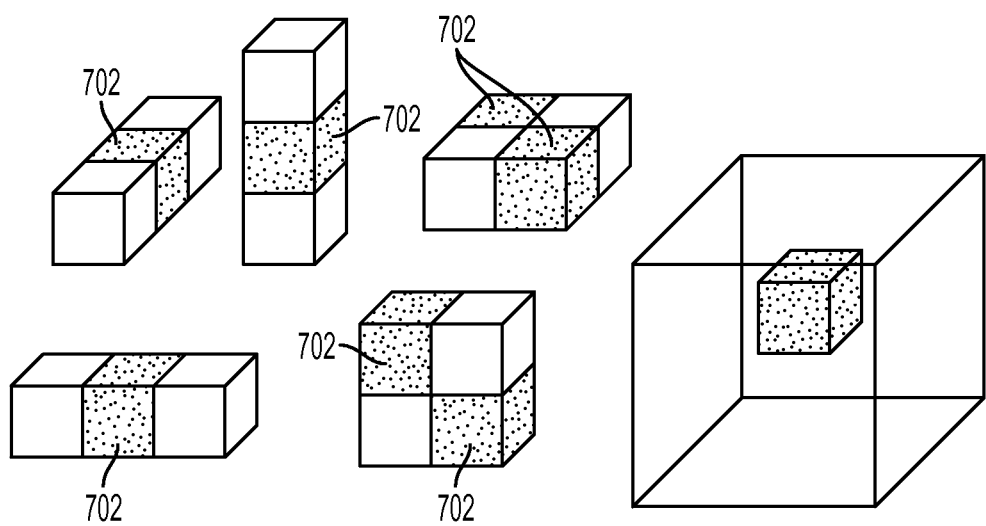
FIG. 7 illustrates exemplary cubes showing Haar feature types, in accordance with an embodiment of the present invention.

Haar features are weighted combinations of the sums of cubic regions of an image. These sums are efficiently calculated using the integral image. The features use no more than four cubes. FIG. 7 illustrates exemplary cubes showing Haar feature types. Cubes 702 indicate negative weights.

Figure 8:
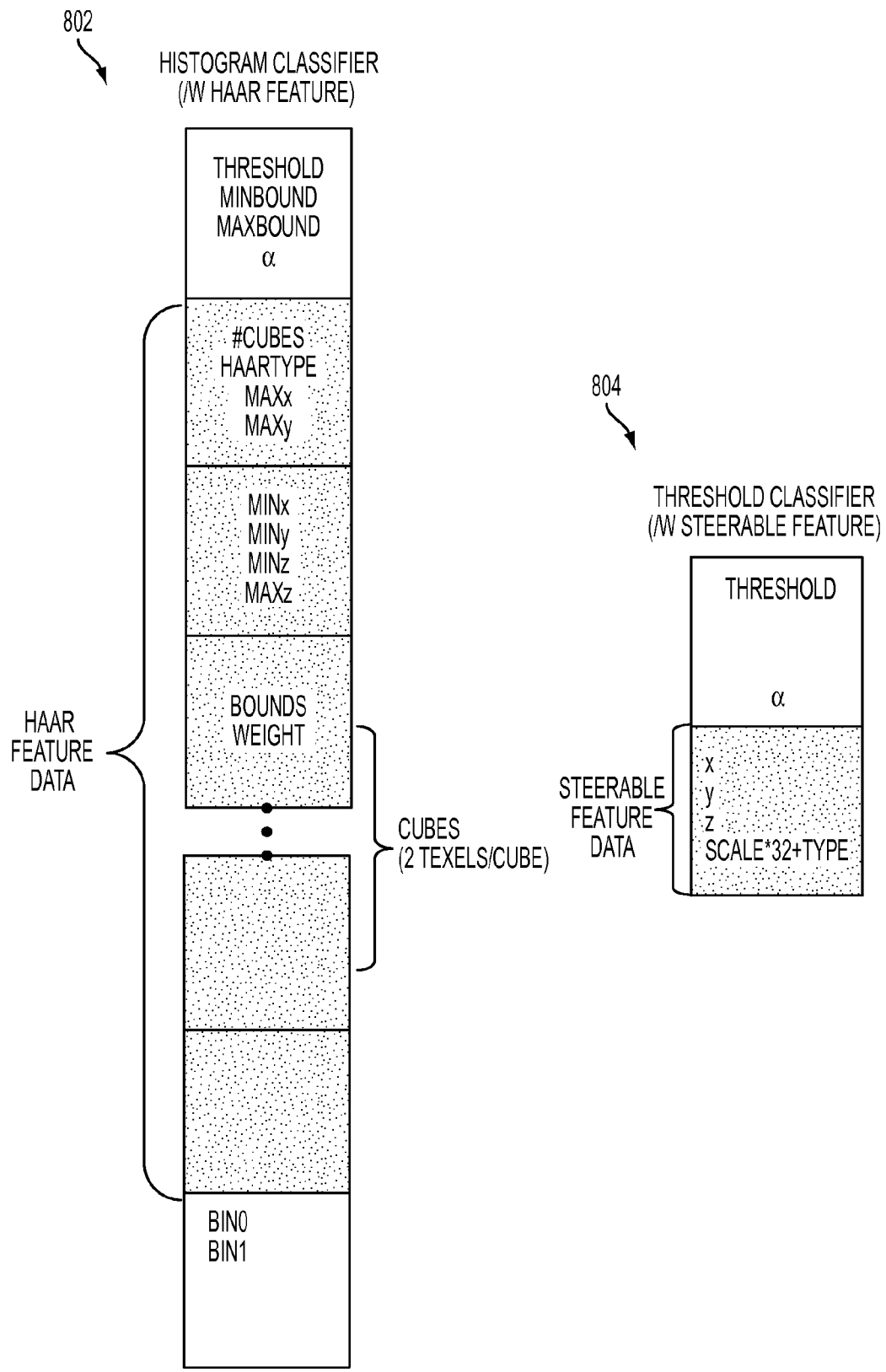
FIG. 8 illustrates a histogram classifier and feature data packed into a single column of a texture image, in accordance with an embodiment of the present invention.

The features possible for a given location consists of various translated and scaled versions of these boxes. Each possible feature can be described by the size, weights, and locations of these cubes (relative to a testing point). FIG. 8 illustrates a histogram classifier and feature data packed into a single column of a texture image. Column 802 shows a layout for Haar features with a histogram classifier, where each cube must be stored in the texture. The histogram contains 64-bins and are packed into two float components that are interpreted as integers. Column 804 shows a steerable feature with a threshold classifier requires only the threshold for the classifier and a single texel to store the feature information.

Evaluation on the GPU then proceeds by looking up cubes for the feature, evaluating the integral image, and combining the results. FIG. 9 shows an exemplary CUDA algorithm for implementing the feature computation described above. To avoid conditionals for boundary testing, the boundary of the integral image is padded with extra planes filled with zeros.

Parallel work efficient algorithms for computing the integral image in a 3D case on a GPU requires mimicking a typical CPU implementation of the 3D integral image computations that proceeds in 3 passes. While performing the padding of the integral images with zeros, as stated above, the accumulation of the image in the x-direction is also performed on the CPU. Once this padded image is transferred to the GPU, a grid of thread blocks on the x-z plane are used to accumulate in the y-direction. The same step is taken for the z direction, where the threads are on the x-y plane.

FIG. 10 shows a table of specific steerable features used. I represents the image intensity, $\nabla I = \{I_x, I_y, I_z\}$, and d is an input sample direction. For a specific sample location, the features are transformations on either a gray value, the gradient, or the projection of the gradient onto an input direction. In the case of oriented box detection, the input direction comes from the x-axis of the box, and a discrete sampling of 3D locations is considered for these features within the detected box. Each of these features can be calculated on one of several image resolutions of an image pyramid. Therefore, each feature is completely described by its position in the 3D sampling pattern (3 integers), the type of feature (1 integer), and the discrete image scale it is computed at (1 integer). By packing the type and scale into a single value (e.g., scale*32+type), this date can be packed into as few as 1 RGBA pixels of a texture image.

To avoid a large conditional or switch statement which treats all of the basic feature types as unique elements, a series of common extractions is extracted. Extraction takes place in two phases, data extraction, and modification. During data extraction, the initial datum to be extracted for modification is extracted. This requires a group of conditionals corresponding to those shown in FIG. 10. After data extraction, three modifiers can be applied: a power, an absolute value, or a logarithm. Both the type of data to be extracted and the subsequent modifier are stored as flags in a table of length 25.

Figure 11:
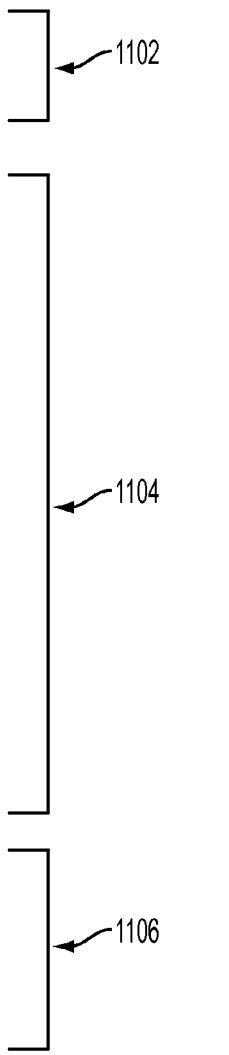
FIG. 11 shows an algorithm for implementation in CUDA for steerable feature evaluation, in accordance with an embodiment of the present invention.

FIG. 11 shows an algorithm for implementation in CUDA for steerable feature evaluation. In the algorithm shown in FIG. 11, $p=\{I, I_x, I_y, I_z\}$, and input direction, $d=\{0, d_x, d_y, d_z\}$, defined at reference number 1102. If threads in a block diverge, the path each thread takes from the others is short (and not the entire evaluation of the feature). The data extraction and storage of flags is represented by reference numeral 1104, and the pixel transformation is represented by reference numeral 1106.

As texture arrays cannot be dynamically indexed in CUDA, the multiple scales of the image are packed into a single texture. An offset table stores the lower left corner of each of the resolutions in this texture.

Figure 12:
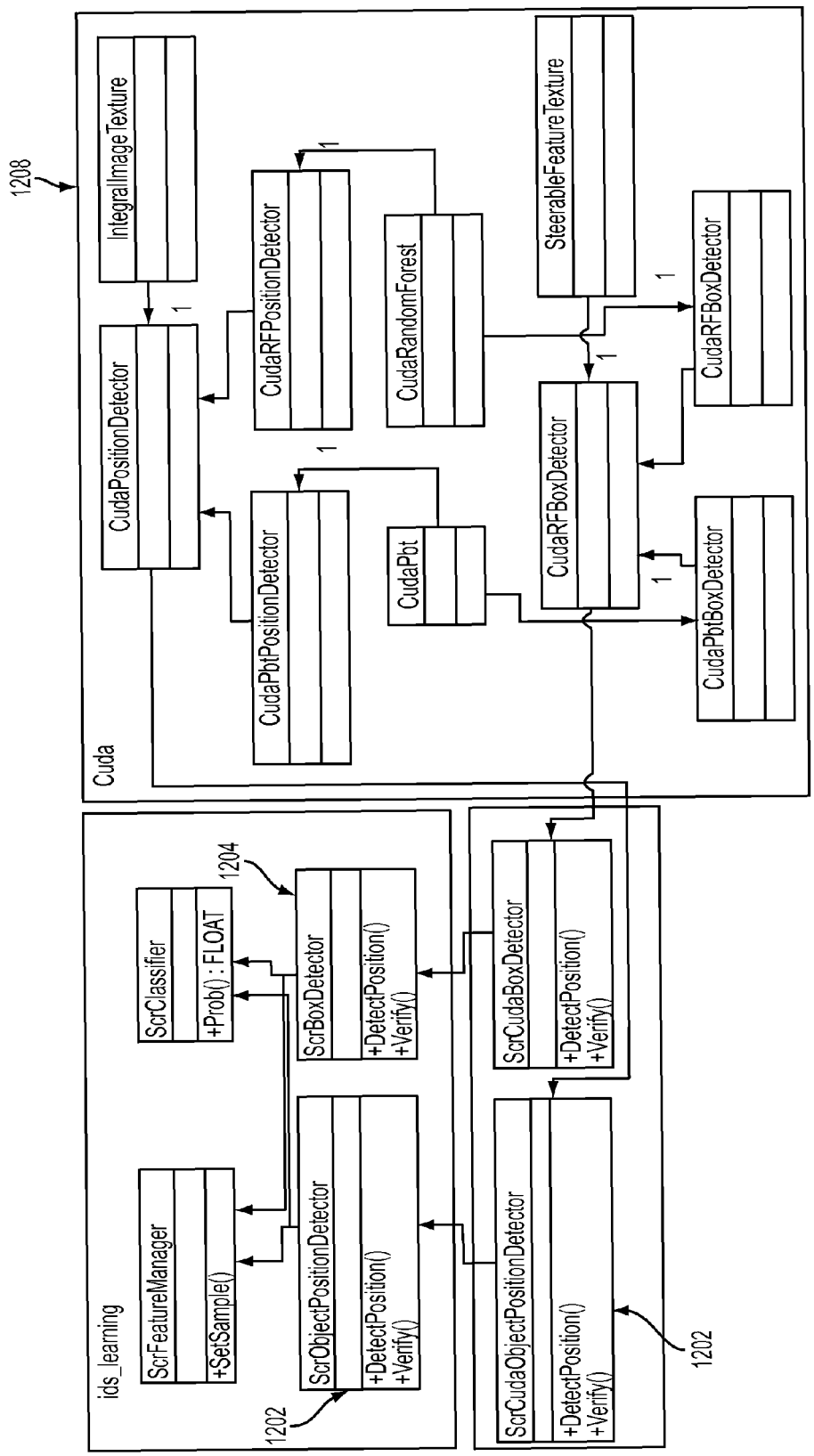
FIG. 12 shows a CUDA implementation integrated into an existing software library, in accordance with an embodiment of the present invention.

FIG. 12 shows a CUDA implementation integrated into an existing software library. The GPU implementation is mostly isolated from the detection package, with the interface being exposed by deriving from the SrcObjectPositionDetector 1202 and SrcBoxDetector 1204. The detector may utilize a classifier, such as a PBT, or a random Forest™, which is discussed below.

In order to interface with CUDA, an object position detector, ScrCudaPositionDetector 1206 replaces the main classifier loop within the CPU position detector. This loop iterates either over entire 3D volumes or a set of previously generated position candidates. The evaluation of the posterior distribution from the underlying classifier is scheduled on the GPU over these locations. The results are then sorted on the GPU and only the required number of candidate locations are transferred back to main memory.

The case is similar for orientation and scale detection which is handled by SrcBoxDetector 1204. A common interface is derived to replace routines responsible for detecting orientation and scale. In these instances, the input is a set of m candidate box locations for which there are also a set of n hypothesis orientations (or scales). During orientation detection, the 3D axes corresponding to the hypothesis orientations are computed and transferred to the GPU as a texture. The CUDA kernel for orientation detection, represented by reference number 1208, uses m*n threads to evaluate the PBT for all possible candidate boxes using each of the potential orientations. The situation is similar for scale detection although the hypothesis scales are transferred to the GPU instead of the orientations.

Figure 13:
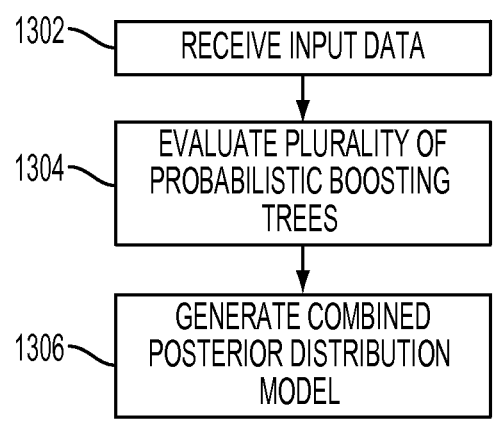
FIG. 13 illustrates a method for evaluating a forest of probabilistic boosting trees, in accordance with an embodiment of the present invention.

FIG. 13 illustrates a method for evaluating a forest of probabilistic boosting trees, in accordance with an embodiment of the present invention. Decision trees, such as the probabilistic boosting tree may be used in a forest algorithm, such as the random forest algorithm. Evaluation of a forest algorithm is similar to that of the PBT. For example, the forest may comprise a plurality of PBTs, and the posterior distribution output of the forest is a combination of the output of each PBT. At step 1302, input data is received at a GPU.

At step 1304, a plurality of PBTs are evaluated using a stack implementation. The stack implementation may be the one described above with respect to the method of FIG. 4.

At step 1306, a combined posterior distribution model of each of the PBTs is generated. The posterior distribution model may be represented by $$\frac{1}{T}\sum_{t=1}^{T} p^{(t)}(+1 \mid x),$$

where T represents the number of trees. The posterior distribution model represents a set of classifications that may be used for object classification and object detection. The set of classifications from the posterior distribution model of the PBT may be used thereafter by a detector to perform detection on image data.

Experiments using the methods described herein were performed. Specifically, the experiments were performed on two hardware setups: Config1) a 1 GB Nvidia 9800 GT with an Intel Core(2) Duo with 3.5 GB of RAM; and Config2) A 1.5 GB Nvidia 480 GTX with an Intel Core Quad with 16 GB of RAM. Results for evaluating PBT are presented, namely feature evaluation, weak classifier evaluation, strong classifier evaluation, and full classifier evaluation. The GPU-PBT implementation was compared to similar implementations of random forests in terms of accuracy and improvements in efficiency.

Unless otherwise noted, all timing results compare the GPU version to an OpenMP implementation, where there are 2 threads for Config1 and 8 threads for Config2. In all examples, the following datasets were used:

1) A Semantic Indexing (SI) data set of ultrasound images of fetal heads used in a semantic indexing project. 990 volumes with 1 mm resolution and dimensions 143×90×110 to 231×161×208 were used for training. 215 were used for testing. The HDN network is built on 6 structures, including, e.g., the Corpus Callosum (CC) and Cerebellum (CER). The HDN network encodes spatial relationships between structures, and performs detection on volume resolutions of 4 mm, 2 mm, and 1 mm.

2) A data set including CT scans of 247 hips with image dimensions ranging from 70×70×89 to 125×125×334. The HDN network consists of position detection for the hip and is performed on resolutions of 16 mm, 8 mm, and 4 mm.

As discussed above, Haar features use the integral image, which can be calculated on the GPU. Table 1, shown below, summarizes the speedups that are possible with GPU accelerated integral image calculation. Table 1 shows speedups in the table comparing the GPU accelerated version to a multithreaded OpenMP version. For each configuration, the right column shows a time when reading back an image is not required. The timings include the time to pad the image and transfer the results on the GPU. For a volume of $256^3$, a five-fold speedup is attained on both systems when the integral image does not need to be read back (as is the case during detection).

TABLE 1

| | Config1 | | Config2 | |
|---|---|---|---|---|
| size | w/ read | w/o read | w/ read | w/o read |
| $64^3$ | 0.79 | 1.58 | 1.49 | 2.49 |
| $128^3$ | 3.47 | 5.07 | 2.15 | 3.44 |
| $256^3$ | 4.04 | 5.57 | 3.11 | 5.20 |
| $400^3$ | 3.89 | 5.35 | 2.95 | 4.86 |

Table 2, shown below, shows speedups gained throughout the evaluation process for both steerable and Haar features. The Feature row considers only evaluating the features. In these tests, the same feature was evaluated on all pixels in a volume. It is apparent that the steerable features give a better speedup, possibly because their implementation involves more computation, whereas the Haar features mostly involve texture lookups and only a few additions (e.g. bandwidth limited). As expected, these speedups propagate into the weak classifier evaluation, which only evaluates a single features and looks up a bit in a histogram bin. However, the strong classifier evaluates and combines the results of roughly 40 weak classifiers. In this case, the two feature types start to behave more similarly, where a 26× speedup is achieved with Config1. On Config2, a strong classifier with steerable features is still 1.5 times faster than the Haar features.

TABLE 2

| | Config1 | | Config2 | |
|---|---|---|---|---|
| | Haar | Steerable | Haar | Steerable |
| Feature | 3.2x | 15x | 4.9x | 21.5x |
| Weak | 10.5x | 25.7x | 38.6x | 112.4x |
| Strong | 26x | 26x | 22.3x | 36.5x |
| PBT | 4.7x | 7x | 11.5x | 12.18x |

When it comes to evaluating an entire tree (the PBT row of Table 2), there is only a 4.7× speedup on Config 1 and 12× on Config 2. The speedup of the strong classifier limits the attainable speedup on the PBT tree. An explanation for the different speedup times may be due to cache consistency. When evaluating a single strong classifier on every pixel, each pixel will access the same relative location as its neighboring pixel. As the tree is descended, neighboring pixels may take different paths down the tree, meaning that they will be evaluating different strong classifiers, which in turn use different features. For both Haar features and steerable features, this means that neighboring pixels will sample from different relative locations in the texture, and different control points may be taken.

Figure 14:
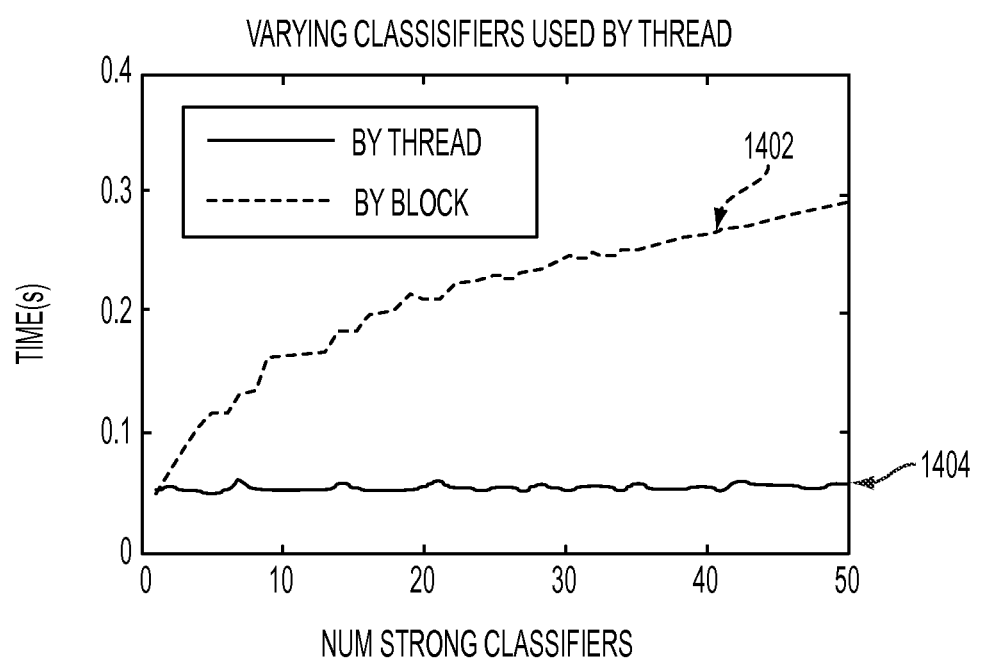
FIG. 14 illustrates a graph showing execution times when threads evaluate different classifiers and when thread-blocks evaluate different classifiers, in accordance with an embodiment of the present invention.

FIG. 14 illustrates a graph showing execution times when threads evaluate different classifiers and when thread-blocks evaluate different classifiers. As nodes in a PBT are descended, threads in the same thread block will evaluate different nodes. The thread curve 1402 represents when threads evaluate different classifiers and the block curve 1404 represents when different thread-blocks evaluate the different classifiers. Thread curve 1402 shows that there is a longer execution time when evaluating different classifiers with threads. FIG. 14 also shows that evaluating the classifier by blocks do not affect the run-times. In contrast, when evaluating by threads, when the tree is deeper, the evaluation is 5× slower.

The results of experiments shown above illustrate the potential benefit of using GPU accelerated PBT evaluation. However, these experiments were carried out in ideal execution environments where there is enough work for the GPU and the same program is being run on all voxels in an image. In the following paragraphs, the PBT is evaluated in the context of the already optimized hierarchical detection system.

Table 3 shows timings and speedups for the detection of 6 structures in the SI data set. These times were averaged over 201 volumes. Most of the execution is in orientation and scale detection (which uses steerable features). On Config1, the overall speedup of 4.8× is slightly lower than the results from the steerable feature PBT evaluation shown in Table 2. Similarly, with Config2, the 9.73× speedup for hierarchical detection was slightly lower than the results from the steerable feature PBT evaluation in Table 2. This is due to hierarchical detection having regions that are inherently serial, which must be performed on the host CPU (e.g., results are read back, candidates are pruned, and detection results are written to files). Furthermore, some of the phases of detection only need to evaluate the PBT on as few as 1000s of elements, meaning that the GPU cannot be fully utilized.

TABLE 3

|  | Config1 | | | Config2 | | |
| --- | --- | --- | --- | --- | --- | --- |
|  | CPU | GPU | S-up | CPU | GPU | S-up |
| LV | 13.9 | 2.63 | 5.28x | 7.22 | 0.57 | 12.7x |
| CC | 1.42 | 0.33 | 4.21x | 0.88 | 0.12 | 7.33x |
| CP | 2.90 | 0.63 | 4.60x | 1.74 | 0.15 | 11.5x |
| HC | 1.11 | 0.32 | 3.46x | 0.77 | 0.15 | 5.20x |
| CER | 6.48 | 1.83 | 3.52x | 4.40 | 0.67 | 6.54x |
| CSP | 7.57 | 1.20 | 6.30x | 3.44 | 0.24 | 14.6x |
| Sum | 33.4 | 6.96 | 4.80x | 18.5 | 1.90 | 9.73x |

While code is executing on the CPU, it is possible to concurrently execute some of the code on the CPU. This trade-off was also investigated via experiments on the orientation detector, which is the most time consuming component of hierarchical detection.

Figure 15:
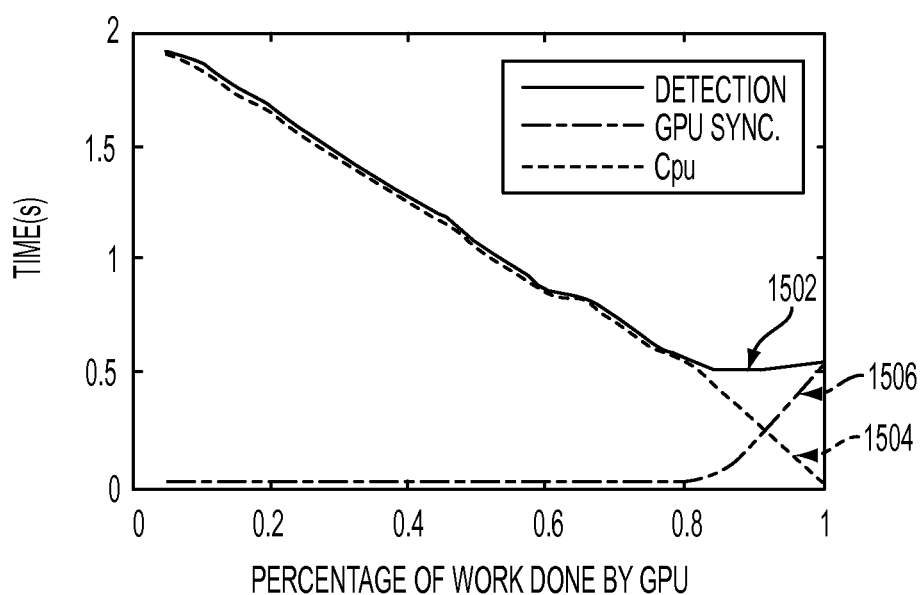
FIG. 15 illustrates total detection time, central processing unit (CPU) execution time, and wait time for a graphics processing unit (GPU), in accordance with an embodiment of the present invention.

In this experiment, a portion of the work was selected and scheduled on the GPU, and then the remaining work was given to the CPU. Once the CPU finished work, execution waited for the preceding GPU call to complete. FIG. 15 illustrates the total detection time, the CPU execution time, and the wait time for the GPU against varying proportions of work assigned to the GPU. The total amount of time for detection is represented by line 1502, the total CPU time is represented by line 1504, and the GPU sync time (wait time for the GPU) is represented by line 1506. The GPU work is started asynchronously after the CPU work is initialized. A non-zero GPU sync time indicates that the GPU does not have enough work. The optimal ratio, from FIG. 15, for the detection line appears to be roughly 0.85.

For Config1, the optimal proportion is expected to be in accordance with speedups obtained in the PBT evaluation. For steerable features, the GPU was 7x faster than the dual core for PBT tree evaluation, so the optimal proportion of work on the GPU is expected to be around 0.875, as confirmed by FIG. 15. In this case, a 10-15% improvement can be expected in the runtime by utilizing the CPU at the same time as the GPU.

Using Config 2, the speedup for orientation evaluation was above 12x, meaning that utilizing the CPU at the same time gives about 5% improvement.

In a further set of experiments, the accuracy and speed-ups attained on the GPU PBT implementation vs. the random Forest™ implementation was compared. A first experiment compares the speed-up of the GPU implementation over a single thread CPU implementation in a classification context. For this example, a random Forest™ of 10 trees of a depth 10 on every pixel of a 96×97×175 3D volume was evaluated. The speedup on Config1 is 26x and Config2 is 114x. Table 4 illustrates the comparison of timings and speed-ups for the GPU implementation of a random Forest™.

TABLE 4

|  | CPU time [s] | GPU time [s] | Speed-up |
| --- | --- | --- | --- |
| Config1 | 29.3 | 1.1 | 26.6x |
| Config2 | 33.7 | 0.294 | 114x |

A second experiment compares the results on hierarchical position, orientation, and scale detection using the CER detection from the SI dataset. In this case, the classifier evaluation makes up a large portion of the total run-time. The PBT was trained to a maximum depth of 6, with 40 weak classifiers, and the forest implementation had a maximum depth of 10 with 50 trees. In terms of total number of weak classifiers, a descent through the forest implementation evaluates more weak classifiers (maximum of 500), whereas the PBT has at most 270 classifiers. However, the PBT uses histogram classifiers, while the forest implementation uses a threshold-based classifier. When testing on the training data, both models achieved similar accuracy. Table 5 illustrates the detection accuracy when testing on training data for the CER data structure on the SI hierarchical data set.

TABLE 5

| Classifier | Center (mm) | Line (mm) |
| --- | --- | --- |
| RF | 1.82 | 2.87 |
| RF(cuda) | 2.00 | 3.09 |
| PBT | 1.81 | 2.83 |
| PBT(cuda) | 1.91 | 3.05 |

Two measurements were used as shown in Table 5: the distance between box centers (Center (mm)), and the maximum distance between end-points of an axial line on the recovered box and the ground truth (Line (mm)). From Table 5, it is apparent that both models behave similarly, and that in each case, the CUDA implementation gives slightly worse results due to a different feature evaluation code.

On both systems, the CUDA accelerated implementation of the forest implementation is more than 10x faster than the multi-core CPU implementation. However, the CPU version of the RF is 2x slower than the PBT with similar accuracy on Config 1. The forest implementation of CUDA achieves a better speed-up compared to the PBT, making the GPU version of the forest implementation 2% slower than the GPU-PBT on Config 1.

Table 6 shows the timing results for the CER detection on the SI data for the two hardware configurations and the PBT and forest models that achieve similar accuracy. The forest implementation is slower on the CPU, but the GPU implementation achieves a greater speedup than the PBT. However, the GPU implementation on the forest is still slower than the GPU implementation of the PBT.

TABLE 6

| | RF model (depth 10, num trees 50) | | | | | |
| --- | --- | --- | --- | --- | --- | --- |
| | Config1 | | | Config2 | | |
| | Cpu(s) | Gpu(s) | S-up | Cpu(s) | Gpu(s) | S-up |
| 1 mm | 7.57 | 0.68 | 11.16 | 4.65 | 0.31 | 14.79 |
| 2 mm | 2.05 | 0.21 | 10.02 | 1.49 | 0.13 | 11.17 |
| 4 mm | 12.62 | 1.02 | 12.41 | 7.39 | 0.25 | 30.11 |
| Total | 22.25 | 1.90 | 11.70 | 13.53 | 0.69 | 19.52 |
| | PBT model (depth 6, num. weak 40) | | | | | |
| | Config1 | | | Config2 | | |
| | Cpu(s) | Gpu(s) | S-up | Cpu(s) | Gpu(s) | S-up |
| 1 mm | 4.02 | 0.78 | 5.12 | 1.63 | 0.29 | 5.55 |
| 2 mm | 1.62 | 0.36 | 4.49 | 0.81 | 0.14 | 5.9 |
| 4 mm | 2.98 | 0.71 | 4.20 | 1.39 | 0.17 | 8.15 |
| Totals | 8.62 | 1.85 | 4.65 | 3.83 | 0.60 | 6.37 |

On the PDT data, a model was trained using 161 training samples and tested on 86 unseen cases. The PBT contained 4 tree levels with 40, 42, 44, and 48 weak classifiers on each level. For the forest implementation, the maximum depth was set to 8 and trained two sets of models with either 10 or 30 trees. The forest implementation with 10 trees performs better than the PBT, which has a similar number of weak classifiers.

Table 7 shows the comparison of timings, speed-ups, and accuracy on the 16-8-4 mm translation hierarchy. The CPU version of the forest implementation is slower; and because better speedups occur on the GPU, the two GPU implementations take the same amount of time. The forest implementation is superior in this example due to superior detection accuracy. Using 30 trees improves accuracy because the GPU accelerated portions occupy more time and better speed-ups can be seen.

TABLE 7

|  | Config1 | | | Config2 | | | Testing |
| --- | --- | --- | --- | --- | --- | --- | --- |
|  | Gpu(s) | Cpu(s) | S-up | Gpu(s) | Cpu(s) | S-up | error |
| PBT | 0.31 | 2.25 | 7.36 | 0.20 | 0.98 | 4.92 | 10.07 |
| Ranfor (10 trees) | 0.31 | 2.56 | 8.34 | 0.21 | 1.20 | 5.61 | 7.47 |
| Ranfor (30 trees) | 0.60 | 6.44 | 10.7 | 0.27 | 2.88 | 10.6 | 4.93 |

The following paragraphs discuss the evaluation of improvements to the training procedure of the PBT. As discussed, the training of AdaBoost classifiers for a PBT could be performed by computing a feature matrix for feature evaluation, and then training the weak classifiers in parallel on the GPU. In the hierarchical network, after the classifier for a PBT is trained, a batch detection phase is performed. During batch detection, the newly trained classifier is used to perform detection on each input volume, and the results are then used by the later nodes in the network. The detection code can be immediately reused to speed-up the phases.

When training a strong classifier, there are often too many positive and negative training samples to build a full feature matrix, so a number of input samples are chosen randomly to build the feature matrix (around 2500 positive and 2500 negative samples). The input samples come from different volumes, and there are often too many volumes to keep on the GPU at all times. Therefore, if the features are to be evaluated on the GPU, the total number of input volumes used by the samples would need to be transferred to the GPU.

Figure 16:
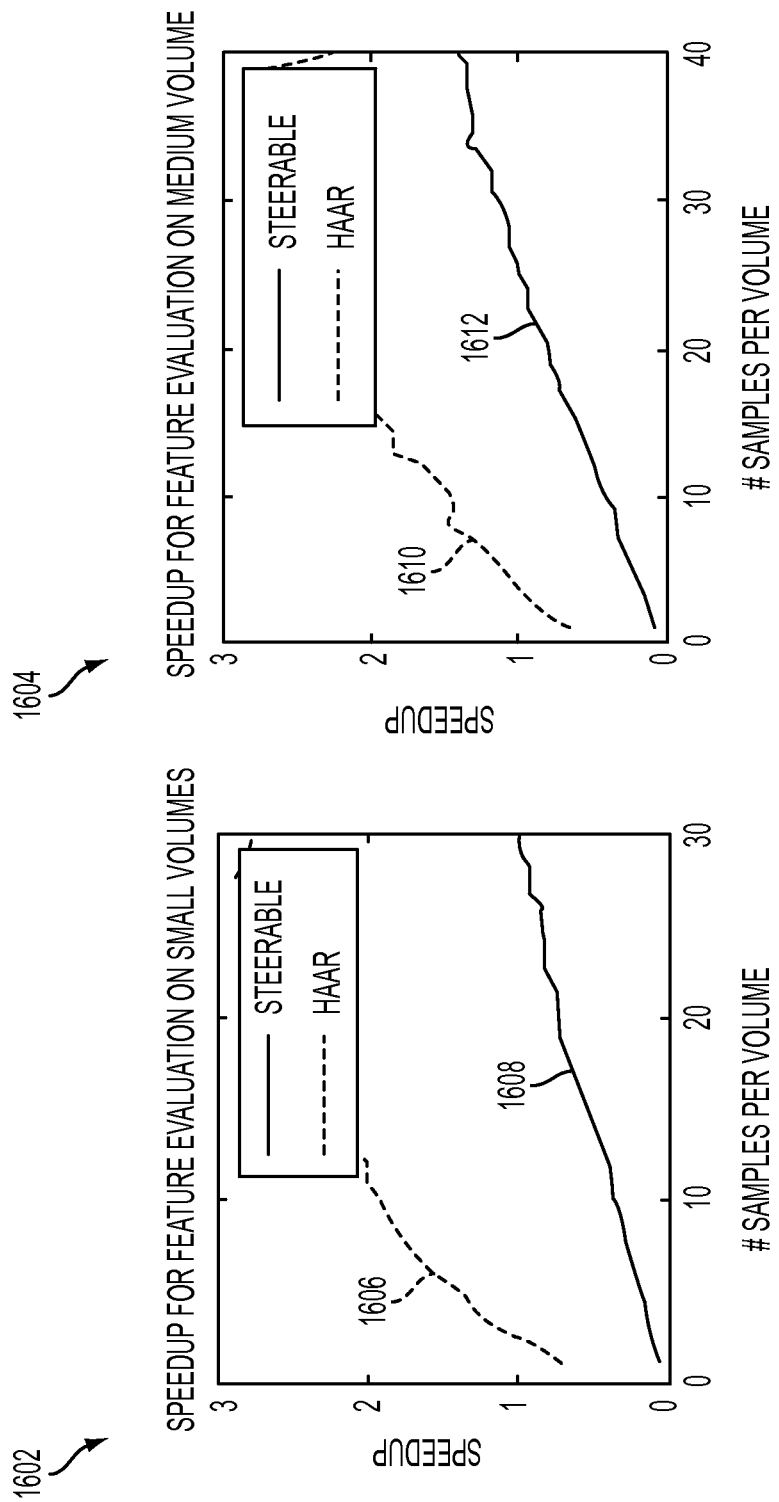
FIG. 16 illustrates speedup comparisons for small volumes and medium volumes, in accordance with an embodiment of the present invention.

In order to evaluate the performance of the feature matrix computation during training, 3 volumes are used and the speed-up is measured in evaluating and reading back all features. FIG. 16 shows speedups for Config2 using small volumes in graph 1602 and speedups for Config2 using medium volumes on graph 1604. The Haar features line for graph 1602 is represented by line 1606 and the Steerable features line for graph 1602 is represented by line 1608. The Haar features line for graph 1604 is represented by line 1610 and the Steerable features line for graph 1604 is represented by line 1612. From FIG. 16 it is apparent that if only a few samples share the same volume, the speed-up will be low. For Haar features, the speed-up also depends on the size of the image (as the integral image is computed on the GPU).

In a benchmark, a hierarchical model was trained. The hierarchical model had 3 resolutions of data, each with translation, orientation, and scale detectors using 300 images from the SI data set. For each PBT trained, there were roughly 2400 positive samples and 140K negative samples. Training of a node used a maximum of 2500 negative samples. Timing results were all computed on Config2. The results after including the CUDA enhancements (not including feature matrix computation) are shown by Table 8. Table 8 shows the total times for phases of the training on Config2. The weak classifier training was sped-up, and the overall computation time gives a 1.5× speedup overall. The 3.5× speed-up on weak classifier training gives a roughly 2.1× speed-up for training a strong classifier. The speed-up on the entire PBT training was 1.7× (which includes loading data, determining which samples to use, propagating samples down the tree, and creating the tree data structure).

TABLE 8

| Component | GPU (s) | CPU (S) | Speed-up |
| --- | --- | --- | --- |
| •• Feature | 1675.3 | 1623.4 | 1.0 |
| •• Weak classifs | 1346.6 | 4695.7 | 3.5 |
| • Strong | 3021.8 | 6319.1 | 2.1 |
| All Train | 4269.4 | 7243.3 | 1.7 |
| Train Detect | 277.9 | 398.7 | 1.4 |
| Other | 1552.7 | 1649.0 | 1.1 |
| Total | 6100.0 | 9291.0 | 1.5 |

Figure 17:
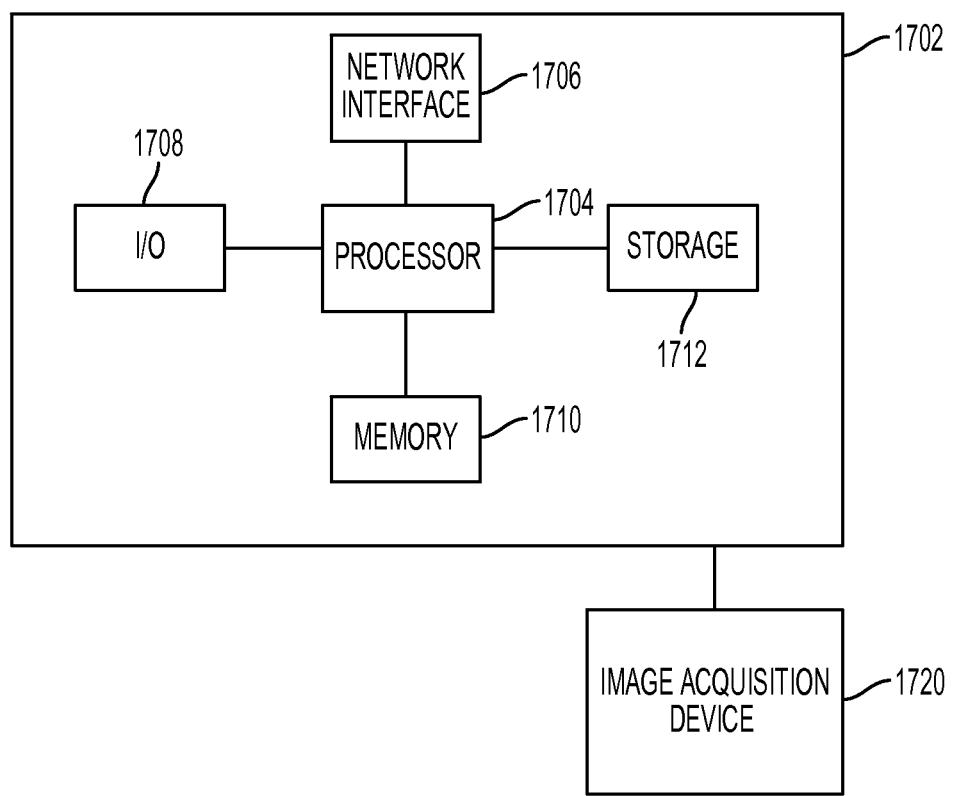
FIG. 17 is a high level block diagram of a computer capable of implementing the present invention.

The above-described methods for evaluation of a probabilistic boosting tree using a stack implementation and for anatomical landmark, position estimation, and object segmentation in a 3D volume, may be implemented on a computer using well-known computer processors, memory units, storage devices, computer software, and other components. A high level block diagram of such a computer is illustrated in FIG. 17. Computer 1702 contains a processor 1704 which controls the overall operation of the computer 1702 by executing computer program instructions which define such operation. The computer program instructions may be stored in a storage device 1712, or other computer readable medium (e.g., magnetic disk, CD ROM, etc.) and loaded into memory 1710 when execution of the computer program instructions is desired. Thus, the steps of the methods of FIGS. 1, 6, and 13 may be defined by the computer program instructions stored in the memory 1710 and/or storage 1712 and controlled by the processor 1704 executing the computer program instructions. An image acquisition device 1720 can be connected to the computer 1702 to input images to the computer 1702. For example the image acquisition device 1720 may be a C-arm image acquisition system capable of inputting 3D C-arm CT images and 2D fluoroscopic images to the computer 1702. It is possible to implement the image acquisition device 1720 and the computer 1702 as one device. It is also possible that the image acquisition device 1720 and the computer 1702 communicate wirelessly through a network. The computer 1702 also includes one or more network interfaces 1706 for communicating with other devices via a network. The computer 1702 also includes other input/output devices 1708 that enable user interaction with the computer 1702 (e.g., display, keyboard, mouse, speakers, buttons, etc.). One skilled in the art will recognize that an implementation of an actual computer could contain other components as well, and that FIG. 17 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for determining the posterior distribution of a probabilistic boosting tree, comprising:
   receiving input data at a graphics processing unit (GPU);
   determining a total posterior distribution value for the probabilistic boosting tree based on the input data using a stack implementation by:
      pushing one or more nodes of the probabilistic boosting tree and a corresponding weight for each of the one or more nodes onto a stack; and
      for each node in the stack:
         calculating an empirical distribution for the node using a discriminative classifier associated with that node,
         if the node is a leaf node, weighting the empirical distribution for the node by the corresponding weight for the node and adding the weighted empirical distribution of the node to the total posterior distribution value;
         if the node has sub-nodes,
            determining which sub-nodes are pushed onto the stack based on the empirical distribution of the node, and
            determining a weight for each sub-node pushed onto the stack based on the empirical distribution of the node.

2. The method of claim 1, wherein pushing one or more nodes of the probabilistic boosting tree onto the stack comprises pushing a root node of the probabilistic boosting tree onto the stack; and
   wherein determining which of the sub-nodes to push onto the stack comprises determining whether to descend down the probabilistic boosting tree thru a node in a left sub-tree or thru a node in a right sub-tree.

3. The method of claim 2, wherein determining whether to descend down the probabilistic boosting tree thru a node in a left sub-tree or thru a node in a right sub-tree comprises:
   determining a discriminative classifier of the root node;
   if the discriminative classifier of the root node satisfies a first condition, descending a left node in the left sub-tree;
   if the discriminative classifier of the root node satisfies a second condition, descending a right node in the right sub-tree; and
   if the discriminative classifier of the root node satisfies a third condition, descending both the left node and the right node;
   wherein the first condition signifies that a left node must be descended, the second condition signifies that a right node must be descended, and the third condition signifies that both a left node and a right node must be descended.

4. The method of claim 3, wherein descending to a left node in the left sub-tree comprises:
   determining a discriminative classifier of the left node;
   if the left node is a leaf node, adding a weighted empirical distribution of the left node to the total posterior distribution value;
   if the left node satisfies the first condition, pushing the left node onto the stack and descend a left child node of the left node;
   if the left node satisfies the second condition, pushing the left node onto the stack and descend a right child node of the left node;
   if the left node satisfies the third condition, pushing the left node onto the stack and descend both the left child node and the right child node.

5. The method of claim 3, wherein descending to a right node in the right sub-tree comprises:
   determining a discriminative classifier of the right node;
   if the right node is a leaf node, adding a weighted empirical weighted distribution of the left node to the total posterior distribution value;
   if the right node satisfies the first condition, pushing the right node onto the stack and descend a left child node of the right node;
   if the right node satisfies the second condition, pushing the right node onto the stack and descend a right child node of the right node;
   if the right node satisfies the third condition, pushing the right node onto the stack and descend both the left child node and the right child node.

6. The method of claim 1, wherein the method for evaluating a probabilistic boosting tree is implemented using a parallel computing architecture.

7. The method of claim 1, wherein the parallel computing architecture is Compute Unified Device Architecture (CUDA).

8. The method of claim 3, wherein the stack is associated with one of a plurality of threads running in parallel.

9. A system for determining the posterior distribution of a probabilistic boosting tree, comprising:
   means for receiving input data at a graphics processing unit (GPU);
   means for determining a total posterior distribution value for the probabilistic boosting tree based on the input data using a stack implementation comprising:
      means for pushing one or more nodes of the probabilistic boosting tree and a corresponding weight for each of the one or more nodes onto a stack; and
      means for calculating an empirical distribution for a node in the stack using a discriminative classifier associated with that node,
      means for weighting the empirical distribution for a node in the stack by the corresponding weight for the node and adding the weighted empirical distribution of the node to the total posterior distribution value when the node is a leaf node;
      means for determining, for a node in the stack having sub-nodes, which of the sub-nodes are pushed onto the stack based on the empirical distribution of the node, and
      means for determining the corresponding weight for each sub-node pushed onto the stack based on the empirical distribution of the node.

10. The system of claim 9, wherein the means for one or more nodes of the probabilistic boosting tree onto the stack comprises means for pushing a root node of the probabilistic boosting tree onto the stack; and
    wherein the means for determining which of the sub-nodes are pushed onto the stack comprises means for determining whether to descend down the probabilistic boosting tree thru a node in a left sub-tree or thru a node in a right sub-tree.

11. The system of claim 10, wherein means for determining whether to descend down the probabilistic boosting tree thru a node in a left sub-tree or thru a node in a right sub-tree comprises:
    means for determining a discriminative classifier of the root node;

means for descending a left node in the left sub-tree if the discriminative classifier of the root node satisfies a first condition;

means for descending a right node in the right sub-tree if the discriminative classifier of the root node satisfies a second condition; and means for descending both the left node and the right node if the discriminative classifier of the root node satisfies a third condition;

wherein the first condition signifies that a left node must be descended, the second condition signifies that a right node must be descended, and the third condition signifies that both a left node and a right node must be descended.

12. The system of claim 11, wherein means for descending to a left node in the left sub-tree comprises:

means for determining the discriminative classifier of the left node;

means for adding a weighted empirical weighted distribution of the left node to the total posterior distribution value if the left node is a leaf node;

means for pushing the left node onto the stack and descend a left child node of the left node if the left node satisfies the first condition;

means for pushing the left node onto the stack and descend a right child node of the left node if the left node satisfies the second condition;

means for pushing the left node onto the stack and descend both the left child node and the right child node if the left node satisfies the third condition.

13. The system of claim 11, wherein means for descending to a right node in the right sub-tree comprises:

means for determining the discriminative classifier of the right node;

means for adding a weighted empirical distribution of the left node to the total posterior distribution value if the right node is a leaf node;

means for pushing the right node onto the stack and descend a left child node of the right node if the right node satisfies the first condition;

means for pushing the right node onto the stack and descend a right child node of the right node if the right node satisfies the second condition;

means for pushing the right node onto the stack and descend both the left child node and the right child node if the right node satisfies the third condition.

14. The system of claim 9, wherein the system for evaluating a probabilistic boosting tree is implemented using a parallel computing architecture.

15. The system of claim 14, wherein the parallel computing architecture is Compute Unified Device Architecture (CUDA).

16. The system of claim 11, wherein the stack is associated with one of a plurality of threads running in parallel.

17. A non-transitory computer readable medium encoded with computer executable instructions for determining the posterior distribution of a probabilistic boosting tree, the computer executable instructions defining steps comprising:

receiving input data at a graphics processing unit (GPU);

determining a total posterior distribution value for the probabilistic boosting tree based on the input data using a stack implementation comprising:

pushing one or more nodes of the probabilistic boosting tree and a corresponding weight for each of the one or more nodes onto a stack; and for each node in the stack:

calculating an empirical distribution for the node using a discriminative classifier associated with that node, if the node is a leaf node, weighting the empirical distribution for the node by the corresponding weight for the node and adding the weighted empirical distribution of the node to the total posterior distribution value;

if the node has sub-nodes, determining which sub-nodes are pushed onto the stack based on the empirical distribution of the node, and determining a weight for each sub-node pushed onto the stack based on the empirical distribution of the node.

18. The computer readable medium of claim 17, wherein the computer executable instructions defining the step of pushing one or more nodes of the probabilistic boosting tree onto the stack comprises computer executable instructions defining the step of pushing a root node of the probabilistic boosting tree onto the stack; and wherein determining which of the sub-nodes are pushed onto the stack comprises determining whether to descend down the probabilistic boosting tree thru a node in a left sub-tree or thru a node in a right sub-tree.

19. The computer readable medium of claim 18, wherein the computer executable instructions defining the step of determining whether to descend down the probabilistic boosting tree thru a node in a left sub-tree or thru a node in a right sub-tree comprises computer executable instructions defining the steps of:

determining a discriminative classifier of the root node;

if the discriminative classifier of the root node satisfies a first condition, descending a left node in the left sub-tree;

if the discriminative classifier of the root node satisfies a second condition, descending a right node in the right sub-tree; and if the discriminative classifier of the root node satisfies a third condition, descending both the left node and the right node;

wherein the first condition signifies that a left node must be descended, the second condition signifies that a right node must be descended, and the third condition signifies that both a left node and a right node must be descended.

20. The computer readable medium of claim 19, wherein the computer executable instructions defining the step of descending to a left node in the left sub-tree comprises computer executable instructions defining the steps of:

determining the discriminative classifier of the left node;

if the left node is a leaf node, adding a weighted empirical weighted distribution of the left node to the total posterior distribution value;

if the left node satisfies the first condition, pushing the left node onto the stack and descend a left child node of the left node;

if the left node satisfies the second condition, pushing the left node onto the stack and descend a right child node of the left node;

if the left node satisfies the third condition, pushing the left node onto the stack and descend both the left child node and the right child node.

21. The computer readable medium of claim 19, wherein the computer executable instructions defining the step of descending to a right node in the right sub-tree comprises computer executable instructions defining the steps of:

determining the discriminative classifier of the right node;
if the right node is a leaf node, adding a weighted empirical weighted distribution of the left node to the total posterior distribution value;
if the right node satisfies the first condition, pushing the right node onto the stack and descend a left child node of the right node;
if the right node satisfies the second condition, pushing the right node onto the stack and descend a right child node of the right node;
if the right node satisfies the third condition, pushing the right node onto the stack and descend both the left child node and the right child node.

22. The computer readable medium of claim 17, wherein computer executable instructions for evaluating a probabilistic boosting tree is implemented using a parallel computing architecture.

23. The computer readable medium of claim 22, wherein the parallel computing architecture is Compute Unified Device Architecture (CUDA).

24. The computer readable medium of claim 19, wherein the stack is associated with one of a plurality of threads running in parallel.

25. The method of claim 1, wherein determining a total posterior distribution value of the probabilistic boosting tree based on the input of data using a stack implementation further comprises:
for each node in the stack having sub-nodes:
calculating the empirical distribution of each sub-node not pushed onto the stack; and
adding a weighted empirical distribution associated with each sub-node not pushed onto the stack to a total posterior distribution value.

26. The system of claim 9, wherein the means for the determining a total posterior distribution value of the probabilistic boosting tree based on the input data using a stack implementation further comprises:
means for calculating the empirical distribution of each sub-node not pushed onto the stack; and
means for adding a weighted empirical distribution associated with each sub-node not pushed onto the stack to a total posterior distribution value.

27. The computer readable medium of claim 17, wherein determining a total posterior distribution value of the probabilistic boosting tree based on the input data using a stack implementation further comprises:
for each node in the stack having sub-nodes:
calculating the empirical distribution of each sub-node not pushed onto the stack; and
adding a weighted empirical distribution associated with each sub-node not pushed onto the stack to a total posterior distribution value.

* * * * *